United States Patent [19]

Fraser

[11] Patent Number: 4,953,776

[45] Date of Patent: Sep. 4, 1990

[54] TURBINE BLADE REPAIR

[75] Inventor: Michael J. Fraser, Broughton Hackett, United Kingdom

[73] Assignee: Refurbished Turbine Components Limited, Droitwich, United Kingdom

[21] Appl. No.: 407,637

[22] Filed: Sep. 15, 1989

[30] Foreign Application Priority Data

Sep. 16, 1988 [GB] United Kingdom ................. 8821812

[51] Int. Cl.⁵ ........................ B23K 31/00; F01D 5/28; B23P 15/02
[52] U.S. Cl. ................................. 228/119; 228/175; 228/182; 228/231; 29/402.13; 416/224
[58] Field of Search ............... 228/119, 164, 170, 175, 228/182, 231; 29/156.8 B, 402.13; 416/224, 230

[56] References Cited

U.S. PATENT DOCUMENTS

| | | |
|---|---|---|
| 3,660,882 | 5/1972 | Widowitz ............................ 416/224 |
| 4,611,744 | 9/1986 | Fraser et al. ........................ 228/119 |
| 4,832,252 | 5/1989 | Fraser ................................. 29/402.13 |
| 4,866,828 | 9/1989 | Fraser ............................. 22/156.8 B |

Primary Examiner—Nicholas P. Godici
Assistant Examiner—Samuel M. Heinrich
Attorney, Agent, or Firm—Parmelee, Miller, Welsh & Kratz

[57] ABSTRACT

A method of repairing turbine blades where it is required to repair a blade while it is in situ on a rotor involves the movement of a lacing wire out of engagement with the blade to be repaired so that the blade may be repaired. The lacing wire may be completely removed from the array and replaced, or a new lacing wire member inseted by providing elongate holes or slots in the blade to enable the lacing wire member or members to be inserted into the blade array.

15 Claims, 2 Drawing Sheets

TURBINE BLADE REPAIR

BACKGROUND OF THE INVENTION

1. Field of the Invention

The present invention relates to the repair of turbine blades and is particularly concerned with repair of turbine blades in which the turbine blade assembly has a plurality of blades interconnected by means of lacing wires, the lacing wires being wires or rods or other members that interconnect a plurality of blades by passing through holes in the blades, the purpose of the lacing wires being to prevent excessive relative movement between the blades and to generally dampen any vibration during operation of the turbine.

As aforementioned, the lacing wires may be wires, rods, tubes or other members and will hereinafter be referred to for the sake of convenience as lacing wires.

In use of turbines the blades are subjected to wear from contact with steam or particles carried by the steam which leads to erosion, particularly on the leading edge of the blade.

In view of the extremely high forces to which the blades are subjected, other damage may occur in the form of cracks which may necessitate complete removal and replacement of the turbine blade, or where the damage is not too severe, the damage can sometimes be rectified by repair to the blade.

2. Prior Art

British patent specification No. 2,091,139 discloses a method of repairing a turbine blade, the method including the step of filling a lacing wire hole with weld material prior to carrying out any welding or brazing operation in the vicinity of the lacing wire hole. When the blade was subsequently subjected to a stress relieving heat treatment, the discontinuity afforded by the lacing wire holes had been eliminated, thereby preventing in-built stress being caused by the heat treatment process around the discontinuity of the lacing wire hole.

Such a method of repair has been found highly satisfactory. However, problems occur where it has been found through improved techniques and equipment to enable repair of a turbine blade to be carried out while the blade is still in position on the rotor, since in view of the proximity of adjacent blades, removal of the lacing wire from the lacing wire hole to enable the hole to be filled has been found to be impossible unless the lacing wire is cut out completely and then it is not possible, without removing the blades from the rotor, to insert new lacing wire.

In practice, the lacing wire is made up of a plurality of pieces of material and in some cases the ends of the lacing wire pieces may be formed so as to overlap each other so as to permit of some relative movement between the lacing wire pieces. In other examples the lacing wire may be secured, for example by a tack weld or braze material, to each blade through which it passes and a small gap may be left between the ends of adjacent lacing wire so that the turbine blades are effectively laced in groups.

In some cases it will not be necessary to fill the lacing wire hole. However, it may still be necessary to remove the lacing wire from the blade to enable a satisfactory repair to be carried out since, for example, access to the blade with the lacing wire in position may not be possible.

SUMMARY OF THE INVENTION

It is an object of the present invention to provide a new method of repair of turbine blades.

According to one aspect of the present invention, we provide a method of repairing turbine blades of the type having a lacing wire, said method incorporating the steps of:

(a) removing any connection between the lacing wire and the turbine blade to be repaired and other blades adjacent the blade to be repaired;

(b) removing any connection interconnecting adjacent members making up the lacing wire;

(c) causing relative movement in a circumferential direction of said lacing wire members in a direction clockwise and/or anti-clockwise so that the lacing wire members are moved in a direction away from the blade to be repaired;

(d) carrying out a repair step on the blade to be repaired after said lacing wire has been removed therefrom;

(e) moving the members forming said lacing wire in opposite directions to which it had previously been moved so as to re-establish said lacing wire in its proper position;

(f) remaking any connection previously disconnected to enable said movement.

Preferably, where the repair step involves a welding or brazing operation, the blade is subjected to a heat treatment process to relative stress in the blade caused by the welding or brazing operating carried out on the blade.

In some cases it will be required to carry out repairs to more than one turbine blade and in this case once a single blade has been repaired, and the lacing wires moved in a clockwise or anti-clockwise direction around the turbine blade array so that they are moved out of register with an adjacent turbine blade which may then be repaired and then each of the blades requiring repair may be repaired in turn. After all the blades have been repaired the lacing wire assembly may be reconnected.

In some turbine blade arrays the lacing wire is made up of many individual members each of which have end parts which overlap an adjacent lacing wire member. Where it is required to remove the lacing wire from at least one blade to enable repair, slight bending of the end parts ajdacent the lacing wire members may be carried out and then by causing the abovementioned circumferential movement of the lacing wire member the two adjacent lacing wire members may be caused to be moved so that one lies alongside the other and if further movement is required, it is envisaged that a hole may be formed in one of the turbine blades so that in effect two lacing wire members may pass through that blade to prevent undue distortion or bending of the lacing wire it is envisaged that any aperture formed in the turbine blade would be adjacent the hole in which the existing lacing wire member is situated.

In some cases where the damage to turbine blades is considerable, in order to effect proper repair, it will be necessary to remove the lacing wires from the blades. If the lacing wire is to be replaced by a new lacing wire, then its removal does not constitute a problem since it may be cut from the blades and the cut parts removed. The replacement however of a new lacing wire can cause a considerable problem while the turbine blades are still in the array.

According to a further aspect of the invention, we provide a method of repairing a turbine blade from which it is required to remove and replace a lacing wire, said method of repair comprising the steps of:

(a) removing at least that part of the lacing wire from the or each blade to be repaired;

(b) carrying out a repair step on the or each blade to be repaired;

(c) forming a hole in at least one turbine blade of a size enabling insertion of a new lacing wire member to said turbine blade array;

(d) moving said lacing wire member around the array to a position out of contact with said blade in which said hole had been formed;

(e) filling said hole;

(f) moving said lacing wire member to its proper position;

(g) remaking any connection between said lacing wire members with each other and with said blades.

Preferably said hole is of elongate form and conveniently may comprise a slot extending from the lacing wire hole to either the leading edge or the trailing edge of a turbine blade.

In some cases a blade adjacent to the blade which has been formed with a slot may be provided with an elongate hole or slot to assist in the insertion of a lacing wire member into said turbine blade array.

Once an individual lacing wire member has been inserted into the array, it may be moved around the array and further lacing wire members inserted until the lacing wire is complete.

The lacing wire members will be moved into a position wherein they are initially out of contact with the blade or blades in which the slots have been formed to enable the filling of said slots and/or holes whereafter the lacing wire members may be placed in their correct position and any required connections between individual lacing wire members and/or blades in the array may then be made.

In other cases, it may be required to remove the lacing wires from a turbine blade array which may not themselves be damaged and hence can be reinserted after the repair step has been carried out.

According to a still further aspect of the invention, we provide a method of repairing a turbine blade in which it is required to remove and replace a lacing wire, said method of repair comprising the steps of:

(a) forming a hole at least in one blade through which the lacing wire passes;

(b) forming said hole adjacent to the hole through which the lacing wire passes;

(c) removing any connection between the lacing wire and the turbine blades of the array;

(d) removing any connections interconnecting adjacent members making up the lacing wire;

(e) causing relative movement in a circumferential direction of the lacing wire members;

(f) causing some lateral movement enabled by the hole formed in the turbine blade so that one end of the lacing wire member be deflected from its normal position either at the front or the leading edges of the turbine blade or at the rear or trailing edges to enable the lacing wire member to be removed from the array.

Said hole may be of oval configuration and may extend from a position adjacent a hole in said turbine blade through which a lacing wire passes towards either the trailing or leading edge of said blade.

It is envisaged that in some cases said hole may comprise a slot that extends from the lacing wire hole in the blade to either the leading edge or the trailing edge of the turbine blade.

In some cases where the turbine blades in an array are in close proximity to each other, a combination of said holes or slots may be necessary to enable the removal of a lacing wire member.

Removal of a lacing wire member in such a manner is necessary if it is essential to remove the lacing wire to effect repair to the turbine blades and if it is desired to replace the original lacing wire member in the blades.

If removal of the lacing wire is necessary and it is also desired to replace the lacing wire member with a new member, then removal in the above described manner is not necessary since the lacing wire member may merely be cut and the individual parts removed from the array. However, in order to replace a new lacing wire member without causing damage thereto or damage to the blades, it will be necessary to provide the holes and/or slots in one or more of the turbine blades the refitting procedure being the reverse of the removal procedure and each lacing wire is re-threaded into the blades provided with the holes and/or slots and moved around the array until all members forming the lacing wire are in place. Subsequent reconnection between the parts may be made if necessary and connection to the blade remade if necessary and the slots and/or holes may be filled.

It is further envisaged that holes or slots may be provided in more than one blade in the array so as to enable removal of the lacing wires from the blades.

According to a further aspect of the present invention, we provide a method of repairing a turbine blade, said method incorporating the removal of the lacing wire from a blade to be repaired as described above and further includes the steps of:

(a) carrying out a repair step on the blade to be repaired after said lacing wire has been removed;

(b) subjecting said blade to a heat treatment process to relieve stress in the blade caused by any welding or brazing operation carried out on the blade to be repaired;

(c) moving the members forming said lacing wire in opposite directions to which they had previously been moved so as to re-establish said lacing wire in its proper position;

(d) re-making any connection previously disconnected to enable said movement.

Preferably, the repair on the turbine blade is carried out in situ. However, if it is required to remove the blade from the array such movement from the array is possible once the lacing wire has been removed from that blade, the blade may be removed from the array so that the repair step may be carried out.

Preferably, if the repair to be carried out involves the application of considerable thermal energy, such as may occur during a welding or brazing operation for example, the blade must be subjected to a heat treatment process to relieve stress in the blade after said welding or brazing operation and prior to said welding or brazing operation said lacing wire hole will be filled with material so as to eliminate discontinuities in the blade to ameliorate said stress relieving heat treatment process.

In some arrangements of turbine blade assembly, the possible movement in the circumferential direction of the members forming the lacing wire may not be sufficient to enable the lacing wire member to be removed from the blade to enable the repair to take place. In some cases, a piece of lacing wire may be removed to enable a sufficient space to be provided to allow movement of the members forming the lacing wire to enable the lacing wire to be removed from at least one blade.

In the case where such a piece is removed, the lacing wire member may be subsequently repaired after the process by securing two pieces together by a sleeve-like member secured by crimping or brazing or welding to the lacing wire member or any other suitable means. In some cases where a piece of one or more of the members forming the lacing wire is removed, the lacing wire may not need to be subsequently repaired. However, gaps existing between lacing members forming the lacing wire as a whole may be slightly increased.

In some instances it is possible that only one or two blades, in an array of fifty or sixty blades for example, may need repair and it is envisaged that in such cases the work and time involved in disconnecting all the members forming the lacing wire so as to enable one or two blades to be freed from the lacing wire may be unnecessarily time consuming.

It will be appreciated that in some cases in order to replace the lacing wire, some circumferential movement of the members forming the lacing wire will be necessary and it is also envisaged that in some cases it will be necessary to replace the lacing wire member in more than one piece to enable insertion through the lacing wire holes, after which such members will have to be joined in any suitable manner and could, for example, be joined by welding, brazing or the inclusion of a sleeve which may be welded or brazed to the ends of the lacing wire member, or alternatively crimped in position.

It has been found that removal of the lacing wire from an array of turbine blades can in many cases considerably facilitate repair in that it provides better access to the blades being repaired which is of considerable benefit when repairs in situ are carried out since the space available is very limited due to the presence of adjacent blades, and furthermore, removal of the lacing wire may permit of more than one blade to be repaired at the same time and enables, for example, one person to repair a blade on one side of the array whilst another person is repairing a blade on the other side of the array.

Since down time of the turbine is often important, it is essential to carry out the repair as quickly as possible which has considerable benefit in speeding up the repair process.

BRIEF DESCRIPTION OF THE DRAWINGS

The method of repair of the present invention will now be described in more detail with reference to the accompanying drawings, wherein.

DESCRIPTION OF THE PREFERRED EMBODIMENTS

Figure 1:
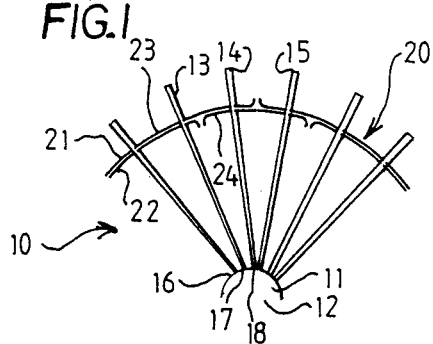
FIG. 1 is a schematic view of part of a turbine array.

Referring first to FIG. 1, the turbine blade array shown schematically comprises a rotor 10 having a shaft 11 with an axis of rotation 12. A series of turbine blades, three of which are shown at 13, 14 and 15 are attached to the shaft 11 by a root part 16, 17, 18.

Figure 2:
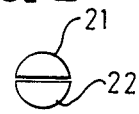
FIG. 2 is a cross-section through the lacing wire shown in FIG. 1.

A lacing wire generally indicated at 20 is made from a plurality of different lacing wire members, e.g. 21, 22, 23, 24 etc., each of which may comprise D-section tube or rod as shown in FIG. 2.

The ends of each member of lacing wire is usually slightly bent so that any relative movement causes engagement of the end with a turbine blade to prevent undue "rotation" of the lacing wire members.

Figure 3:
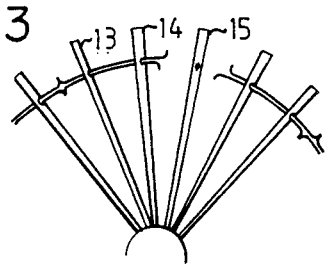
FIG. 3 is a schematic view of the turbine blade array in which the lacing wires have been removed.

In order to remove the lacing wires from one of the blades, e.g. the blade 15 as shown in FIG. 3, any connection between the lacing wire 20 or individual members forming the lacing wire 20 and the turbine blades is freed, for example if it was a tack weld the tack weld could be ground away, and the members forming the lacing wire are moved in a direction towards a position diametrically opposite to the rotational axis 12 from the blade 15.

Since a small distance exists between the bent end portions of adjacent blades, by closing said gaps a much bigger gap can be created so that the lacing wires may be cleared from one blade 15. In some cases it will not be possible for there to be sufficient movement available to enable the lacing wire 20 to be clear of one blade and in such cases one or more of the members forming the lacing wire 20 may be cut to remove a piece thereof, which piece may be subsequently replaced or another piece inserted therefor which will be later described.

Once the lacing wire 20 has been removed from a blade, for example the blade 15, to be repaired the blade may if required be removed from the rotor and if it is not required to be removed from the motor, it may remain in place and the repair may be carried out in situ. The removal of the lacing wire in such manner enables the lacing wire hole to be filled prior to any stress relieving heat treatment of the blade.

After the repair step has been carried out and the heat treatment process is over, the lacing wire hole may be re-drilled and the lacing wires moved in an opposite direction towards the blade 15 to take up their normal position, any securing of the lacing wire members to the blades of the array may then take place.

Figure 4:
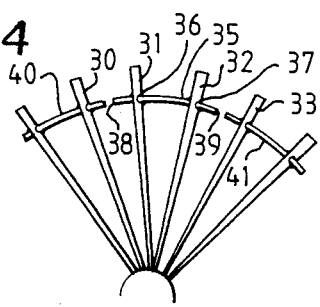
FIG. 4 is a schematic view of a turbine blade array with an alternative form of lacing wire.

Referring now to FIG. 4, an alternative lacing wire is shown in which the blades, e.g. 30, 31, 32, 33 of an array are secured in groups, in the example illustrated in groups of two. However, in practice they may be groups having a considerable number of turbine blades by a single lacing wire member, e.g. the blades 31 and 32 are secured relative to each other by lacing wire member 35.

The lacing wire member 35 may be in the form of a rod or tube and may be secured to one, several or even all of the blades in the group for example by a tack welding securing the lacing wire to each blade. Such a weld is shown on the blades 31 and 32 at 36 and 37 respectively.

In the example shown, gaps 38 and 39 are present between the ends of the lacing wire member 35 and adjacent lacing wire members 40 and 41 respectively, and in this case the gaps are sufficiently large and the total number of gaps around the array sufficient to enable movement of the lacing wire members in a direction diametrically opposite a blade to be repaired to enable at least one blade to have the lacing wire member removed completely therefrom to enable the repair to be carried out. In the example illustrated, since the lacing wires are secured to the blades, it will be necessary for such securement to be removed before movement of the lacing wire members can take place.

Figure 5:
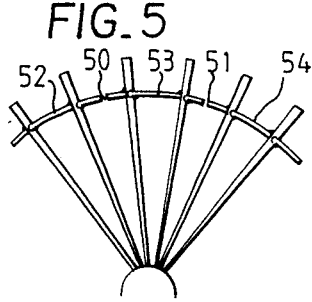
FIG. 5 is a schematic view of a turbine blade array with a still further alternative lacing wire.
Figure 6:
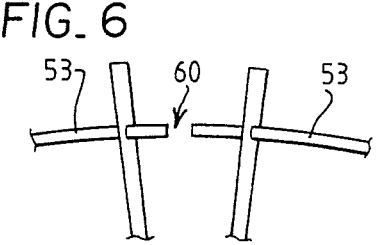
FIG. 6 is a view of a lacing wire in which a part has been removed.
Figure 7:
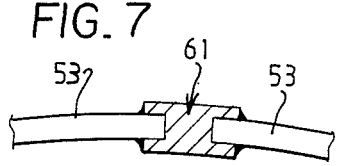
FIG. 7 is a view of a joint to a lacing wire following removal of a piece thereof.

FIG. 5 shows a similar arrangement. However, in this case the gaps 50 and 51 between adjacent groups of blades tied by a respective lacing wire member 52, 53 and 54 are too small to permit one of the blades to have the lacing wire member completely removed therefrom even when all the members, for example those shown at 52, 53 and 54 forming the lacing wire are moved in a direction diametrically opposite to the blade to be repaired. In such cases it will be necessary to remove a piece of lacing wire such as the piece 60 (FIG. 6) removed from lacing wire member 53, and the provision of an additional gap will enable movement of the lacing wire members so that a blade to be repaired may have the lacing wire removed completely therefrom and subsequent to the repair of the blade, and indeed any other blades that have to be repaired, a joining piece such as that shown at 61 (FIG. 7) may be secured to the lacing wire member 53 and welded thereto or brazed, crimped or in any other suitable way connected to the lacing wire 53 to bridge the gap formed by the piece that has been removed.

It is further envisaged that by a slight increase in the gap between adjacent lacing wire members, it may not be necessary to provide a joining piece 61 and where this is the intention, the piece would be removed from the end of a lacing wire member rather than a position between its ends. It will be appreciated that the size of the piece removed would ensure that the lacing wire member is still sufficient length to span the required number of blades.

It is further envisaged that a small piece may be removed from more than one lacing wire so as to enable sufficient movement of the lacing wire members to enable one of the blades to be freed from the lacing wire so that repair may be effected.

Figure 8:
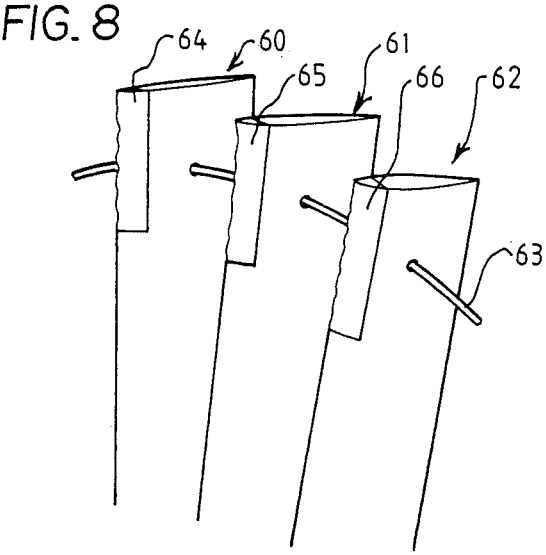
FIG. 8 is a perspective schematic view of three turbine blades, the lacing wire passing therethrough.

Referring now to FIG. 8, three blades 60, 61 and 62 are shown, all being interconnected by a lacing wire member 63.

Each of the blades 60, 61 and 62 has a hard metal shield 64 to 66 respectively, the hard metal shield being to minimise the effects of erosion and is commonly made of Stelite.

Figure 9:
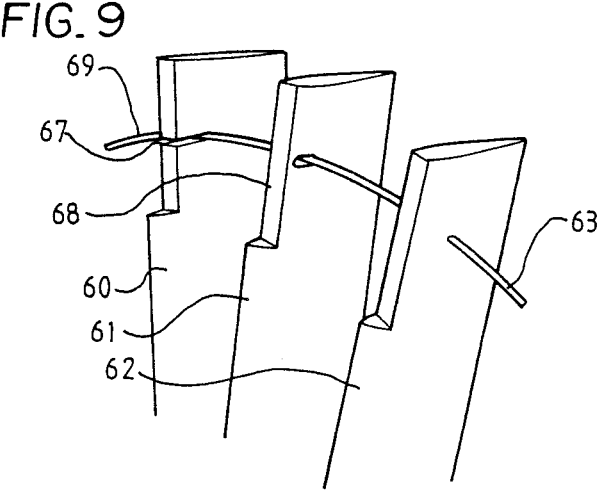
FIG. 9 is a view of the blades shown in FIG. 8 following the formation of slots into the blades to enable release of the lacing wire.

The replacement of an erosion shield, such as those shown at 64, 65 and 66 is a not infrequent repair and it is usual to cut out the piece of material of the blade carrying the shield since usually, not only the shield but also part of the blade surrounding the shield, is also eroded and FIG. 9 illustrates the blades 60, 61 and 62 in which the erosion shields have been removed.

In order to also remove the lacing wire 63 so that the hole may be filled prior to heat treatment, a slot 67 and an oval hole 68 are formed in blades 60 and 61 respectively to enable some lateral movement of the lacing wire member 63 once the end 69 has been freed and by a combination of lateral movement and some deformation of the lacing wire member 63, it may be removed from the blades 60, 61 and 62 and others in the array through which it may extend.

In the example shown, if it is only required to remove one lacing wire member, since it is required to carry out heat treatment of any repaired blade while the lacing wire hold member is filled and obviously the slot 67 and oval hole 68 also filled, it is envisaged that the lacing wire member 63 will be replaced in more than one part to enable insertion into the re-formed lacing wire holes followed by joining of the parts to complete the lacing wire member 63.

Apart from enabling a proper repair to be made once the lacing wire has been removed, a further very significant advantage is gained in that once the lacing wire is free of the blade, the blade may be set by the application of physical force into its correct position, or any other desired position without any force applied to the blade being transmitted either to the lacing wire or to adjacent blades.

I claim:

1. A method of repairing a turbine blade of the type having a lacing wire, said method incorporating the steps of:
    (a) removing any connection between the lacing wire and the turbine blade to be repaired and other blades adjacent the blade to be repaired;
    (b) removing any connection interconnecting adjacent members making up the lacing wires;
    (c) causing relative movement in a circumferential direction of said lacing wire members in a direction clockwise and/or anti-clockwise so that the lacing wire members are moved in a direction away from the blade to be repaired;
    (d) carrying out a repair step on the blade to be repaired after said lacing wire has been removed therefrom;
    (e) moving the members forming said lacing wire in opposite directions to which it had previously been moved so as to re-establish said lacing wire in its proper position;
    (f) remaking any connection previously disconnected to enable said movement.

2. A method of repairing a turbine blade according to claim 1 wherein the repair step involves a welding or brazing operation on the blade and further comprising the step of subjecting the blade to a heat treatment process to relieve stress in the blade caused by the welding or brazing operation.

3. A method of repairing a turbine blade according to claim 1 where more than one blade in the array has to be repaired and including the further step of completing the repair on one blade and moving said lacing wire members on an adjacent blade effecting repair on said adjacent blade and continuing movement of the lacing wire members until all the blades in the array requiring repair have been repaired.

4. A method of repairing a turbine blade, said method comprising the steps of:
    (a) removing at least the part of the lacing wire from the or each blade to be repaired;
    (b) carrying out a repair step on the or each blade to be repaired;
    (c) forming a hole in at least one turbine blade of a size enabling insertion of a new lacing wire member to said turbine blade array;

(d) moving said lacing wire member around the array to a position out of contact with said blade in which said hole had been formed;
(e) filling said hole;
(f) moving said lacing wire member to its proper position;
(g) remaking any connection between said lacing wire members with each other and with said blades.

5. A method of repair according to claim 4 wherein said hole is of oval configuration.

6. A method according to claim 4 wherein said hole comprises a slot extending to the leading edge of said turbine blade.

7. A method according to claim 4 wherein said hole comprises a slot extending to the trailing edge of the turbine blade.

8. A method of repairing a turbine blade according to claim 1 wherein an aperture is formed in at least one of said turbine blades to enable movement of said lacing wire members out of contact with at least one blade in the array.

9. A method of repairing a turbine blade according to claim 8 wherein a piece of at least one of said lacing wire members forming said lacing wire is removed to enable said lacing wire members to be moved out of contact with a blade to be repaired.

10. A method of repairing a turbine blade in an array of blades having a lacing wire, said method requiring the removal and replacement of the lacing wire, said method comprising the steps of:
    (a) forming a hole at least in one blade through which the lacing wire passes;
    (b) forming said hole adjacent to the hole through which the lacing wire passes;
    (c) removing any connection between the lacing wire and the turbine blades of the array;
    (d) removing any connections interconnecting adjacent members making up the lacing wire;
    (e) causing relative movement in a circumferential direction of the lacing wire members;
    (f) causing some lateral movement enabled by the hole formed in the turbine blade so that one end of the lacing wire member be deflected from its normal position either at the front or the leading edges of the turbine blade or at the rear or trailing edges to enable the lacing wire member to be removed from the array.

11. A method of repair according to claim 10 wherein said hole is of oval configuration.

12. A method according to claim 10 wherein said hole comprises a slot extending to the leading edge of said turbine blade.

13. A method according to claim 10 wherein said hole comprises a slot extending to the trailing edge of the turbine blade.

14. A method of repairing a turbine blade according to claim 10 wherein said method further comprises the steps of:
    (a) carrying out a repair step on the blade to be repaired after said lacing wire has been removed;
    (b) subjecting said blade to a heat treatment process to relieve stress in the blade caused by any welding or brazing operation carried out on the blade to be repaired;
    (c) moving the members forming said lacing wire in opposite directions to which they had previously been moved so as to re-establish said lacing wire in its proper position;
    (d) re-making any connection previously disconnected to enable said movement.

15. A method of repairing a turbine blade according to claim 1 wherein said repair on the or each turbine blade is carried out while said turbine blade is connected to said rotor.

* * * * *